United States Patent Office 2,706,731
Patented Apr. 19, 1955

2,706,731

ANTHRAQUINONE VAT DYESTUFFS

Eduard Moergeli, Basel, Switzerland, assignor to Ciba Limited, Basel, Switzerland, a Swiss firm No Drawing. Original application December 17, 1951, Serial No. 262,173. Divided and this application May 28, 1954, Serial No. 433,307

Claims priority, application Switzerland June 3, 1949

The portion of the term of the patent subsequent to November 2, 1971, has been disclaimed 4 Claims. (Cl. 260—327)

This application is a division of my copending application Serial No. 262,173, filed on December 17, 1951, which itself is a continuation in part of my application Serial No. 100,298, filed June 20, 1949, the latter being now abandoned.

The present invention is based on the observation that valuable vat dyestuffs are produced when one molecular proportion of an acylating agent derived from thianthrene dicarboxylic acid is reacted with two molecular proportions of 1-amino-5-(2'-fluorobenzoylamino)-anthraquinone, 1-amino-5-(4'-chloro-2'-fluorobenzoylamino)- anthraquinone or 1-amino-5-(5'-chloro-2'-fluorobenzoylamino)-anthraquinone.

Accordingly the new dyestuffs correspond to the formula

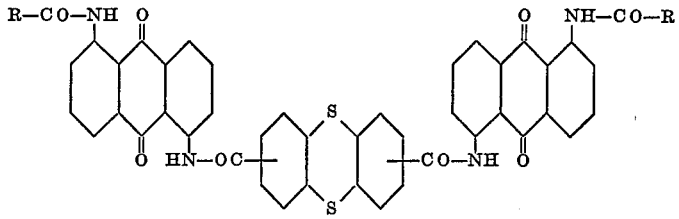

wherein R stands for a member selected from the group consisting of the radicals corresponding to the formulae

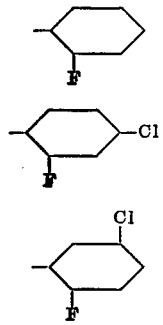

1-amino-5-(4'- or 5'-chloro-2'-fluorobenzoylamino)-anthraquinone can be prepared by monoacylation of 1:5-diaminanthraquinone. The 2-fluoro-4- or -5-chlorobenzoic acid which are necessary for introducing the corresponding acyl radicals can be made by methods in themselves known. A suitable method for preparing such compounds consists, for example, in diazotizing 1-amino-2-methyl-4- or -5-chlorobenzene with the aid of hydrofluoric acid and sodium nitrite, the appropriate fluorine substitution product being formed either simultaneously with diazotization by the action of the hydrofluoric acid or by subsequent conversion of the diazo compound into the fluorine substitution product with the splitting off of nitrogen. In the resulting 1-fluoro-2-methyl-4- or -5-chlorobenzene the methyl group is either oxidized directly to a carboxylic acid group or converted into a trichloromethyl group followed by hydrolysis of the latter to a carboxylic acid group.

The 1-amino-5-(2'-fluoro-benzoylamino)-anthraquinone or 1-amino-5-(2'-fluoro-4'- or -5'-chlorobenzoylamino)- anthraquinone are acylated with an acylating agent derived from thianthrene dicarboxylic acid.

In all cases it is of advantage to carry out the acylation with the air of reactive derivatives of the carboxylic acid in question. The reaction may be conducted in a solvent or dispersing medium, advantageously of high boiling point such as mono-, di-, or tri-chlorobenzene, nitrobenzene or naphthalene at a raised temperature, for example, within the range from about 100° C. to the boiling point of the solvent or dispersing medium used.

The products of the invention are valuable vat dyestuffs. They can be used in known manner as such or in the form of their leuco-ester salts obtainable by known methods for dyeing and printing a very wide variety of fibers of animal and especially vegetable character, thus wool and silk, but especially cotton, linen, and artificial silk or staple fibers of regenerated cellulose and also superpolyamide fibers.

The following examples illustrate the invention, the parts and percentages being by weight unless otherwise stated and the relationship of parts by weight to parts by volume being the same as that of the kilogram to the liter:

Example 1

A mixture 3.04 parts of thianthrene-dicarboxylic acid (obtained as disclosed in U. S. Patent No. 2,338,516), 16 parts of thionyl chloride, 0.05 part of pyridine and 290 parts of trichlorobenzene is heated in about 2 hours from 80° C. to boiling temperature. Then 60 parts of the solvent are distilled off and 7.5 parts of 1-amino-5-(2'-fluorbenzoylamino)-anthraquinone are added at about 100° C. and the whole is heated again to boiling and kept at this temperature for 2 hours while stirring. The difficultly soluble dyestuff of the formula

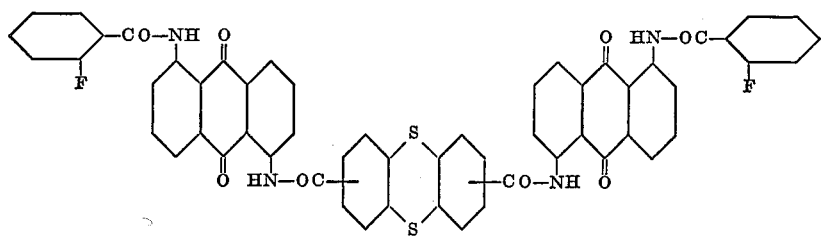

is filtered off at 120° C. and washed with alcohol. It is soluble in concentrated sulfuric acid with an orange coloration and dyes cotton from a bordeaux colored hydrosulfite vat in very fast golden yellow shades.

The 1-amino-5-(ortho-fluorobenzoylamino)-anthraquinone employed can be obtained by partial acylation of 1:5-diamino-anthraquinone with ortho-fluorobenzoyl chloride or from 1-chloro-5-(ortho-fluorobenzoylamino)-anthraquinone by replacement of the chlorine atom by the toluene sulfonamide residue and splitting off of the sulfonic acid residue. It crystallizes from pyridine or nitrobenzene in fine red crystals which melt at 269.5–270° C. (uncorrected).

*Example 2*

A mixture of 1.12 parts of thianthrene dicarboxylic acid of the constitution such as is used in British Patent No. 555,055, 6 parts of thionyl chloride, 0.05 part of pyridine and 90 parts of trichlorobenzene is stirred for 30 minutes at 80° C. and for a further 30 minutes at 120° C., and is then heated at the boil, whereupon thionyl chloride and some of the solvent distil off. The solution is allowed to cool to 100° C., 3 parts of 1-amino-5-(2'-fluoro-4'-chlorobenzoylamino)-anthraquinone are added, and the whole is heated for 2 hours at 200–210° C.

After cooling to about 120° C. the dyestuff of the formula

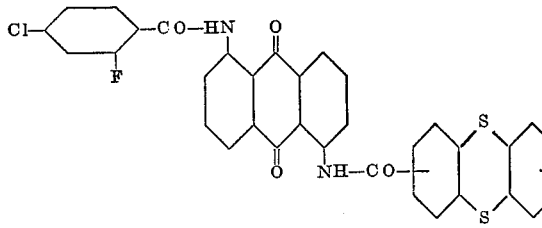

is separated by filtration. It dissolves in concentrated sulfuric acid with a red coloration and dyes cotton fast yellow tints.

A dyestuff of similar properties is obtained if the 1-amino-5-(2'-fluoro-4'-chlorobenzoylamino)-anthraquinone is replaced by 1-amino-5-(2'-fluoro-5'-chlorobenzoylamino)-anthraquinone.

The 1-amino-5-(4'-chloro-2'-fluorobenzoylamino)-anthraquinone used (melting point 279° C.) can be made by the partial acylation of 1:5-diaminoanthraquinone with 2-fluoro-4-chlorobenzoyl chloride, or from 1-chloro-5-(4'-chloro-2'-fluorobenzoylamino)-anthraquinone by replacing the chlorine atom by a toluene sulfonamide radical followed by splitting off of the sulfonic acid radical. 1-amino-5-(5'-chloro-2'-fluorobenzoylamino)-anthraquinone (melting point 269° C.) can be made in the same manner.

2-fluoro-4-chlorobenzoyl chloride (boiling at 105–106° C. under 14 mm. pressure) can be made from 2-fluoro-4-chlorobenzoic acid (melting point 205° C.) by reaction with thionyl chloride.

The 2-fluoro-4-chlorobenzoic acid can advantageously be prepared by the oxidation with potassium permanganate of 2-fluoro-4-chlorotoluene (boiling at 158° C. under 743 mm. pressure, which latter can be obtained from 2-amino-4-chlorotoluene by the hydrofluoboric acid method of Balz and Schiemann (Berichte der deutschen Chemischen Gesellschaft, vol. 60, page 1188 (1927)) in excellent yield. In an analogous manner 2-flouro-5-chlorobenzoyl chloride (boiling at 103–104° C. under 15 mm. pressure) can be obtained from 2-amino-5-chlorotoluene by way of the intermediate products 2-fluoro-5-chloro-toluene (boiling at 156° C. under 741 mm. pressure) and 2-fluoro-5-chlorobenzoic acid (melting at 149–150° C.).

What is claimed is:

1. An anthraquinone vat dyestuff of the formula

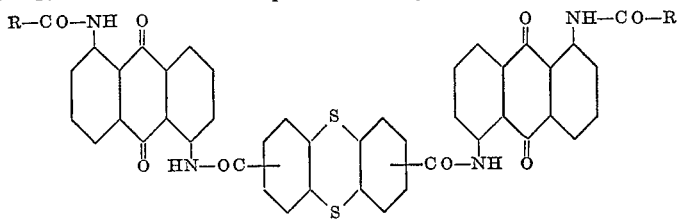

wherein R stands for a member selected from the group consisting of the radicals corresponding to the formulae

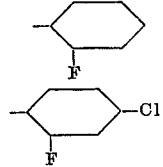

and

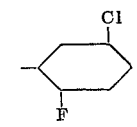

2. The anthraquinone vat dyestuff of the formula

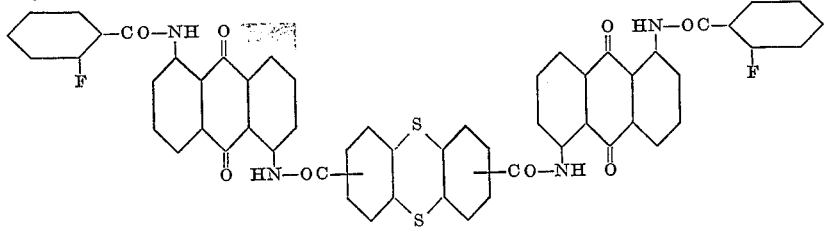

3. The anthraquinone vat dyestuff of the formula

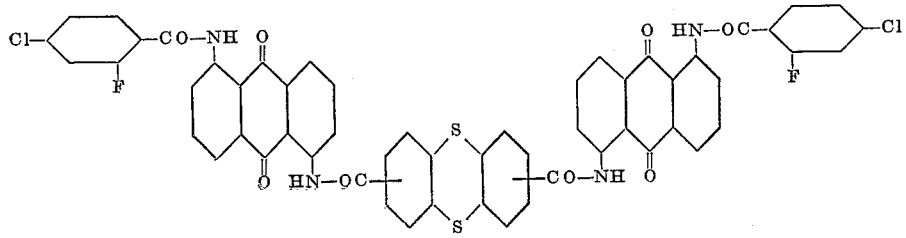

4. The anthraquinone vat dyestuff of the formula
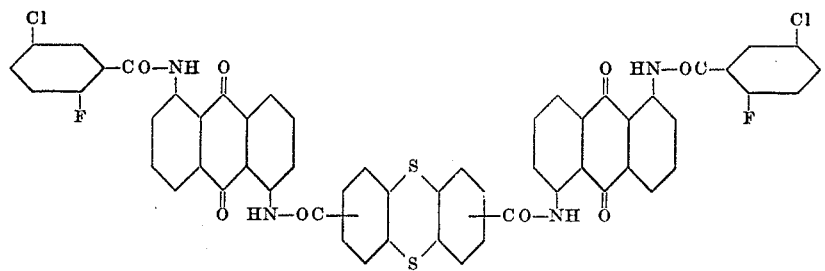
References Cited in the file of this patent
UNITED STATES PATENTS
| | | |
|---|---|---|
| 2,338,516 | Kern et al. | Jan. 4, 1944 |
| 2,693,473 | Moergeli et al. | Nov. 2, 1954 |